Figure 35:
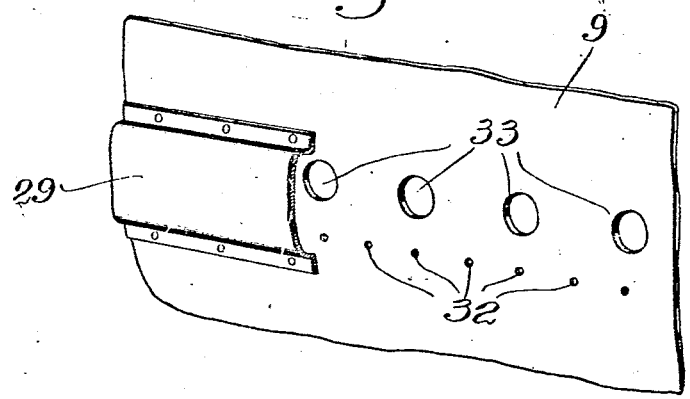

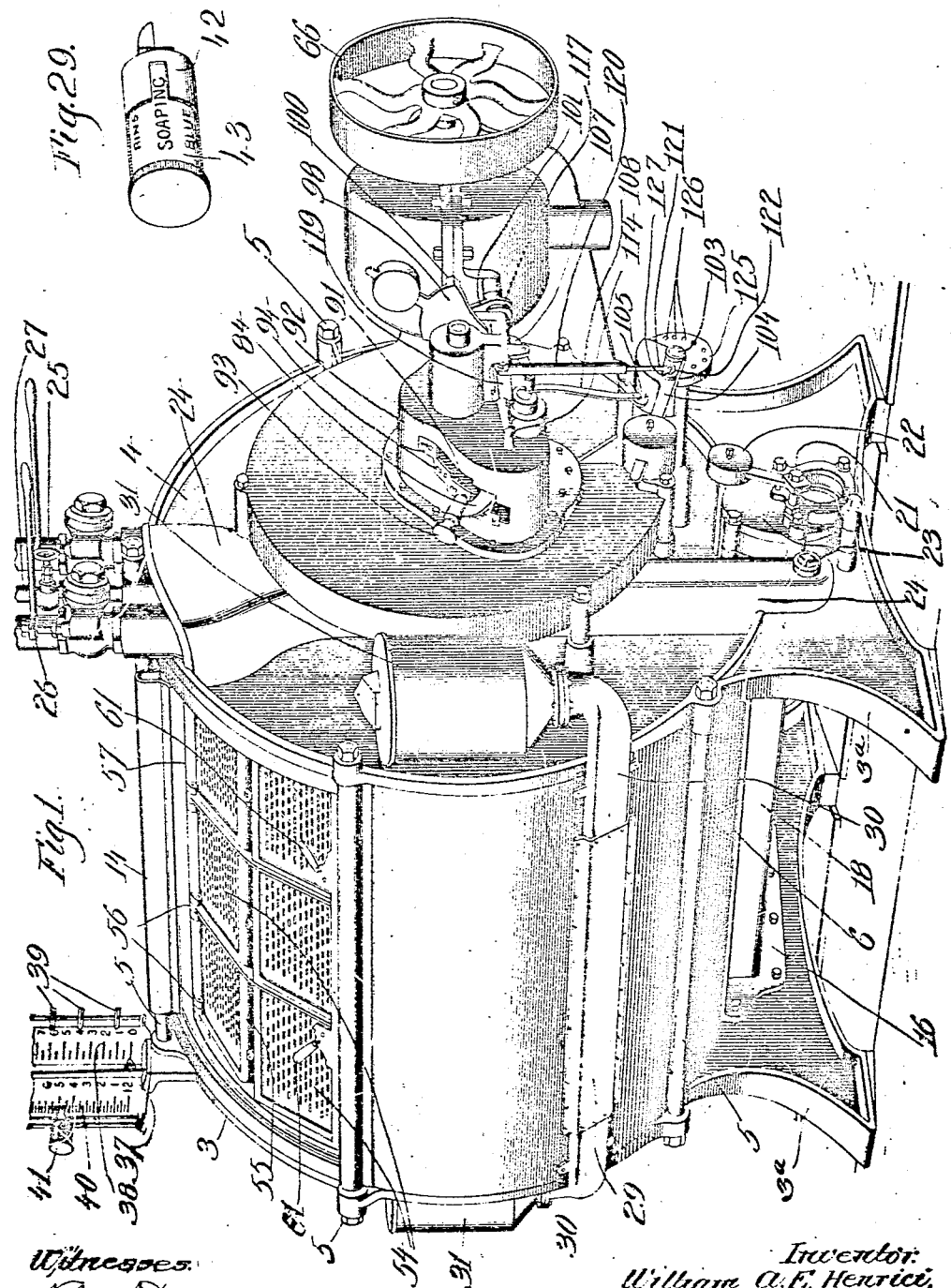

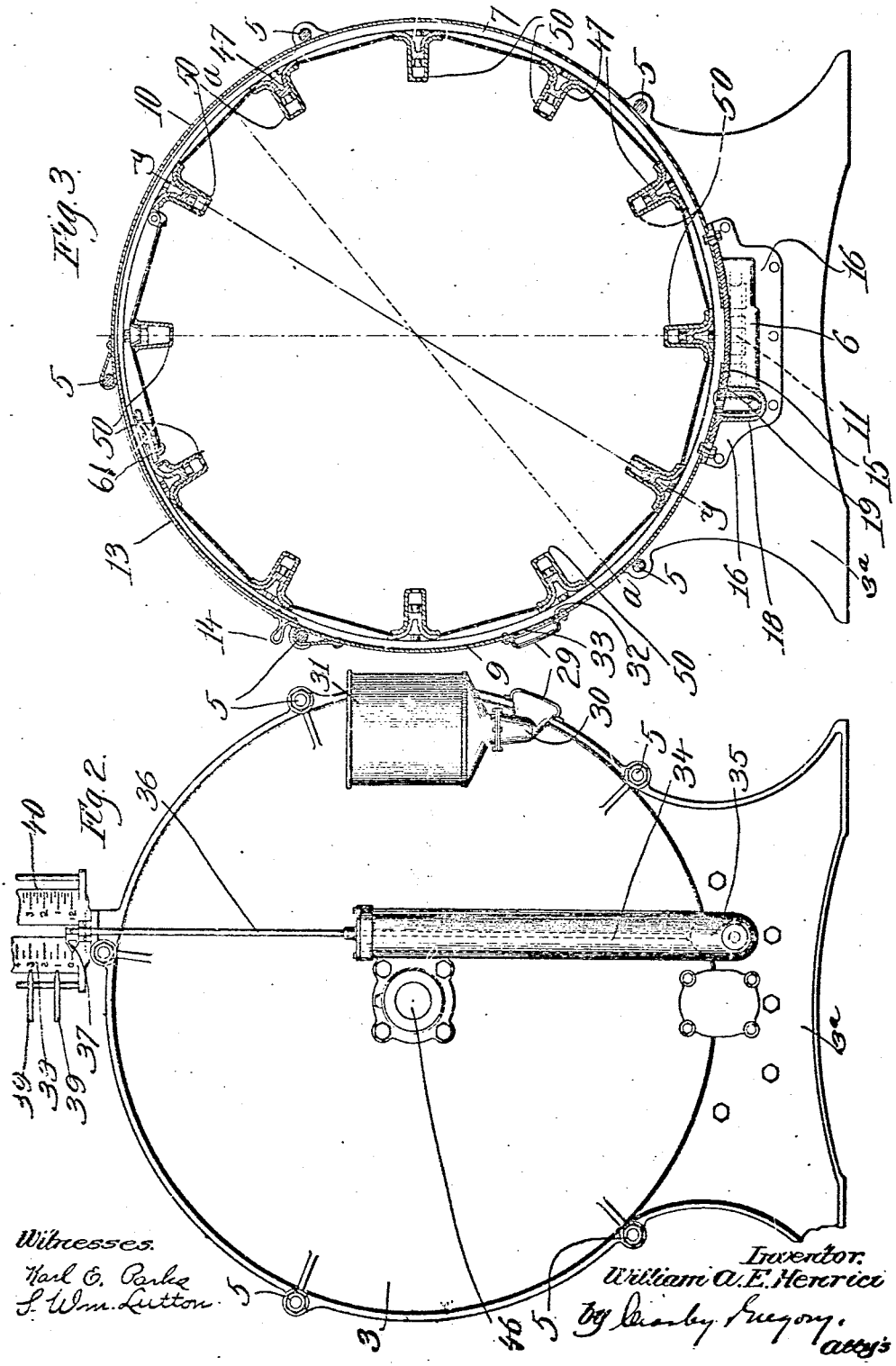

W. A. E. HENRICI.
WASHING MACHINE.
APPLICATION FILED FEB. 6, 1905.
947,776.
Patented Jan. 25, 1910.
9 SHEETS—SHEET 3.
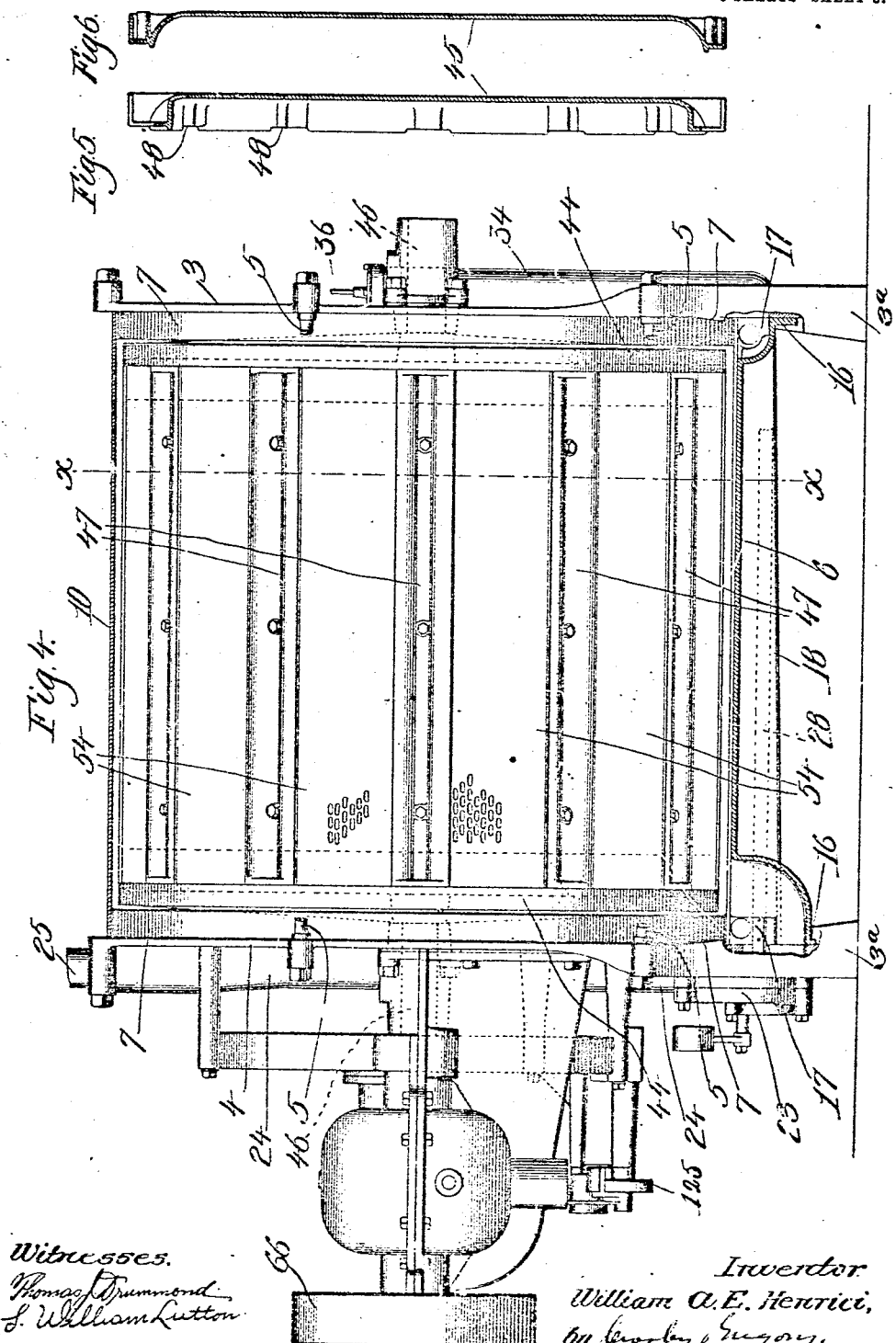
Witnesses.
Thomas Drummond
S. William Lutton
Inventor
William A. E. Henrici,
by Crosby & Gregory.
Attys.

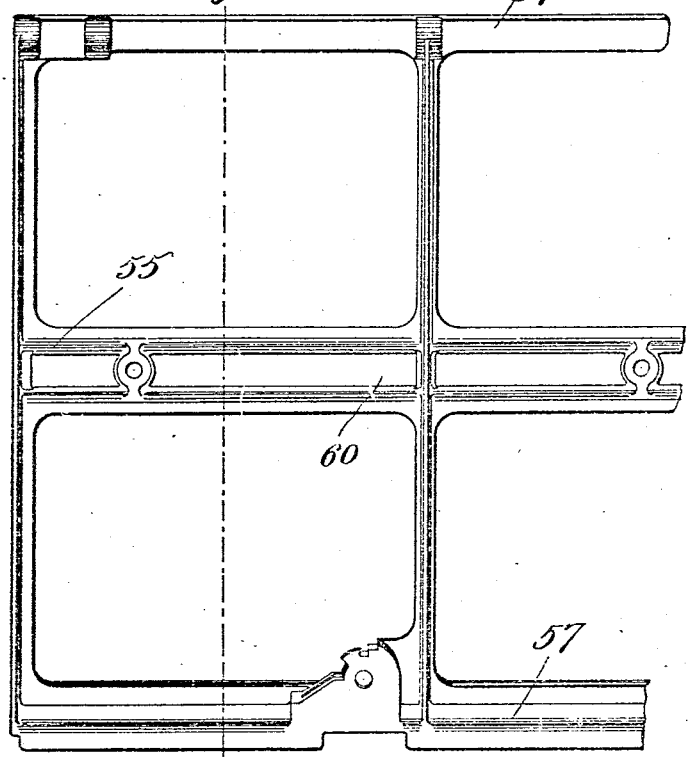
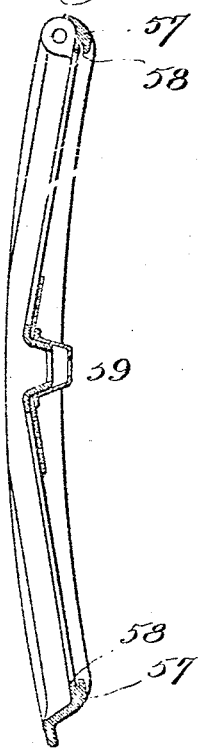
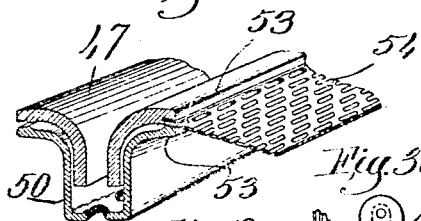
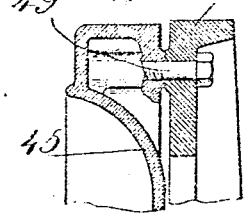
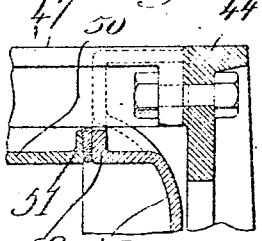
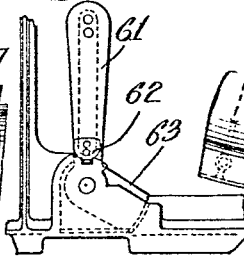
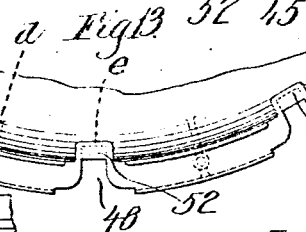

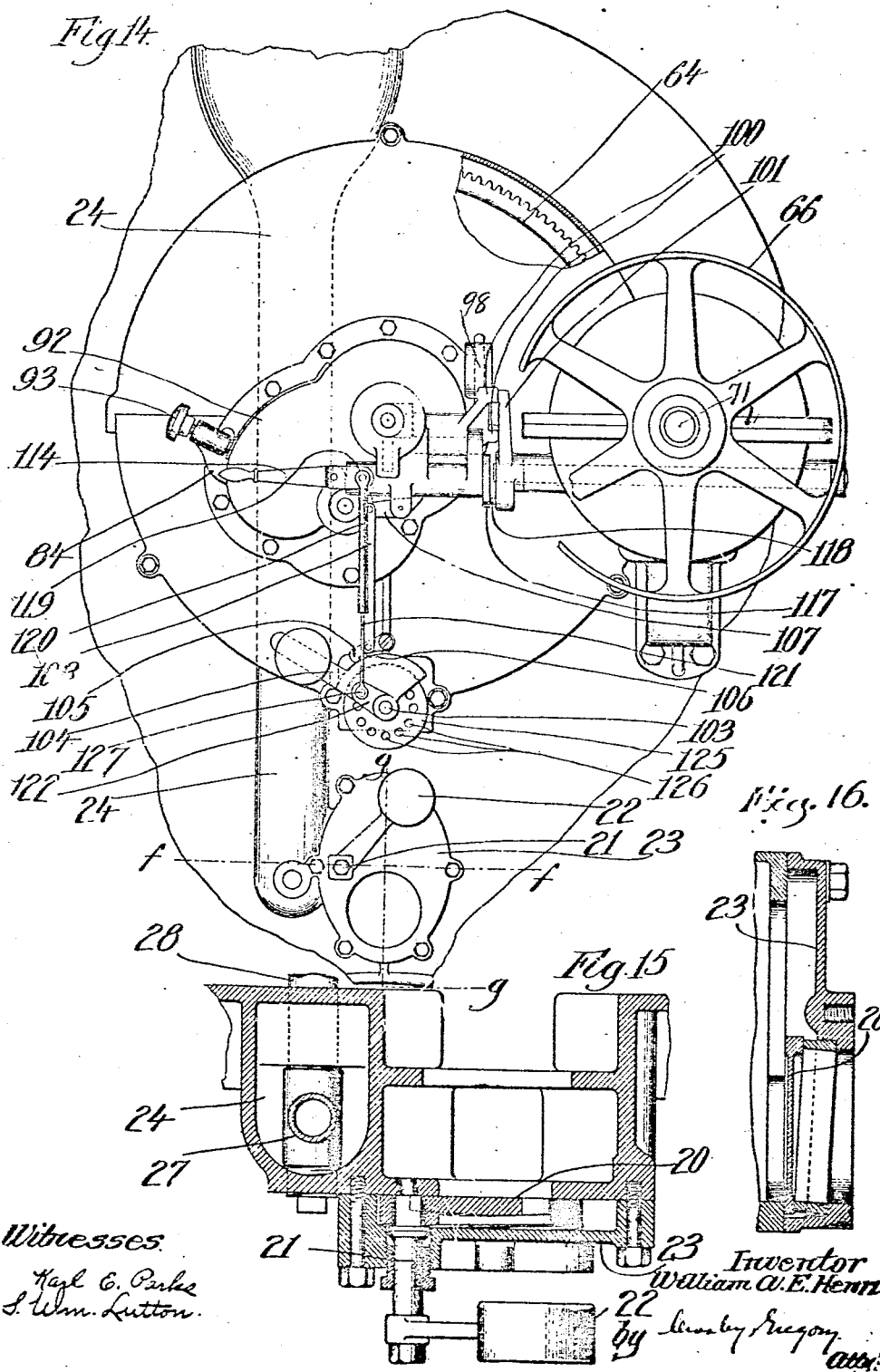

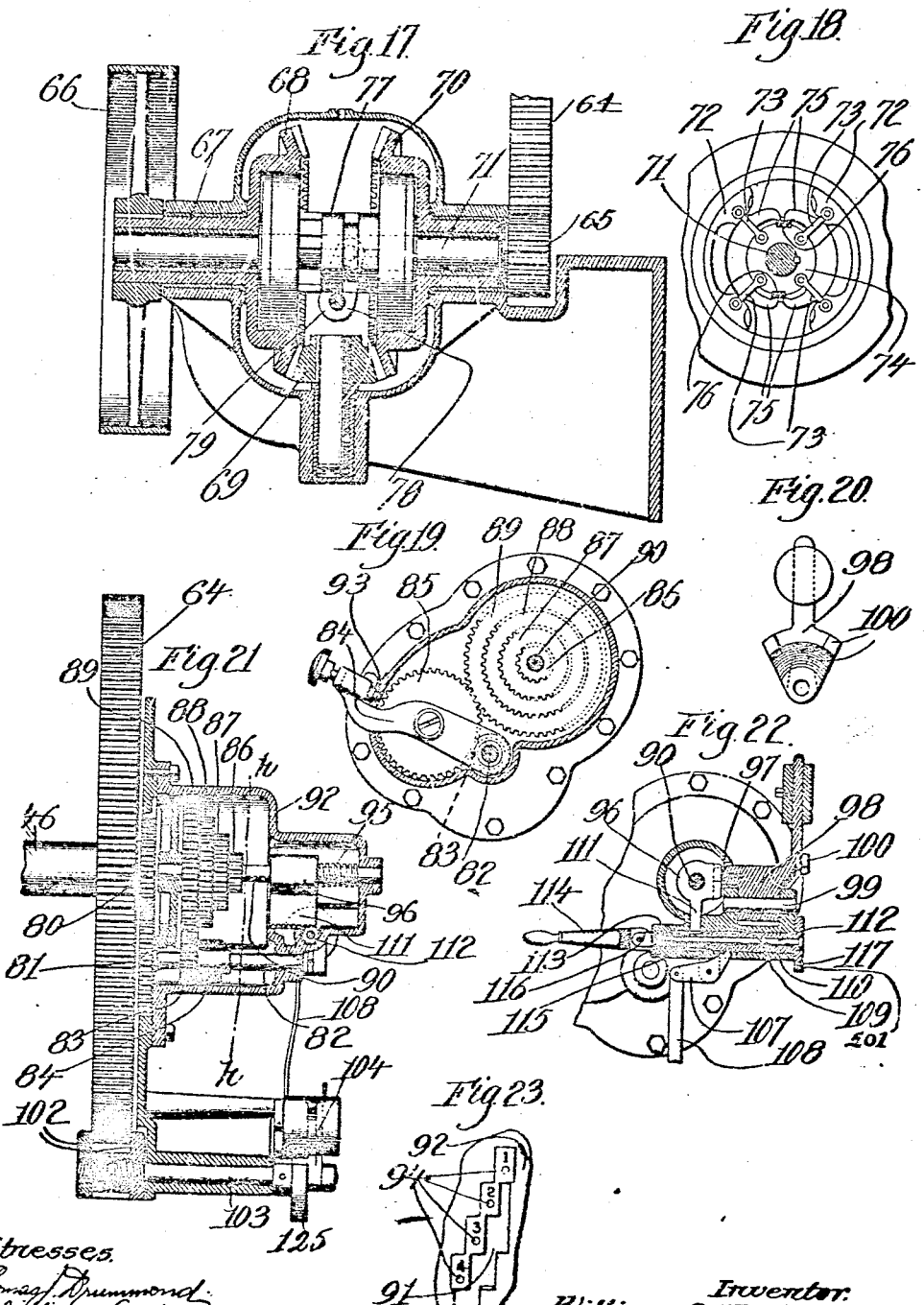

W. A. E. HENRICI.
WASHING MACHINE.
APPLICATION FILED FEB. 6, 1905.
947,776.
Patented Jan. 25, 1910.
9 SHEETS—SHEET 7.
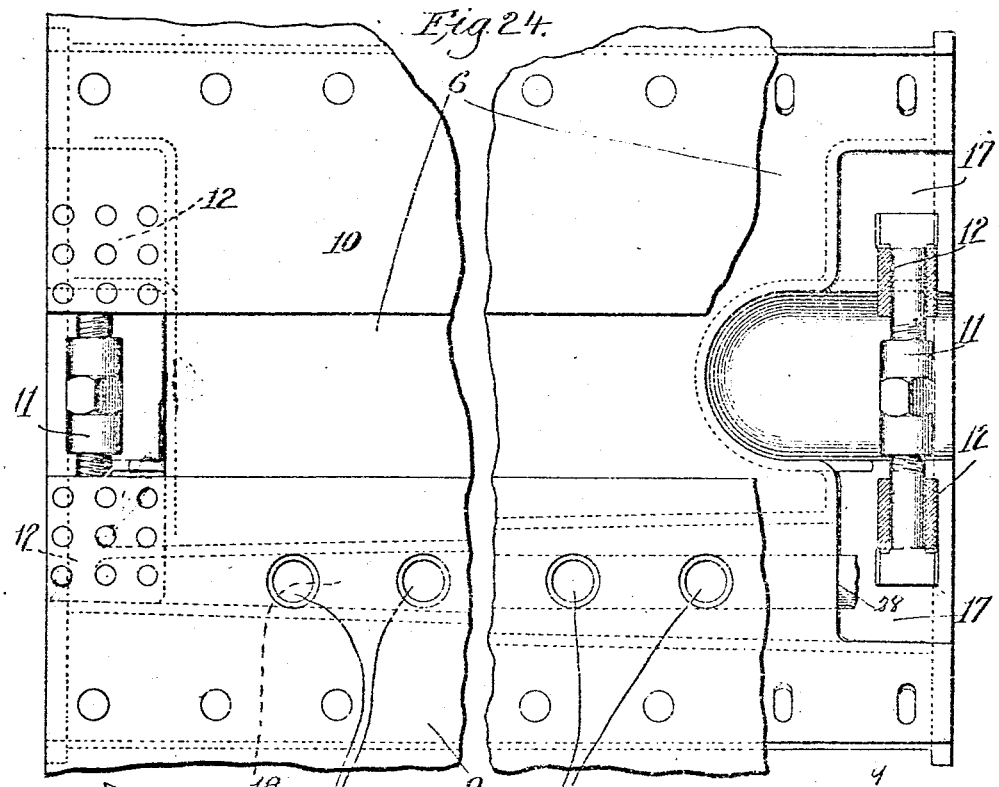
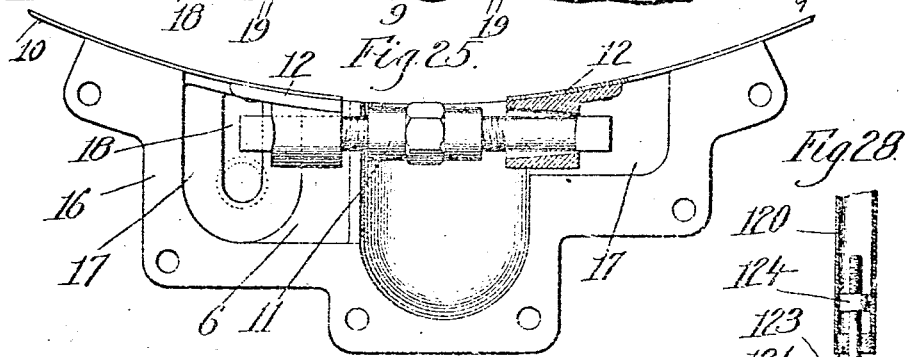
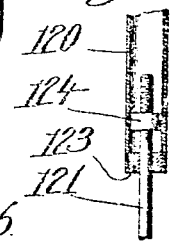
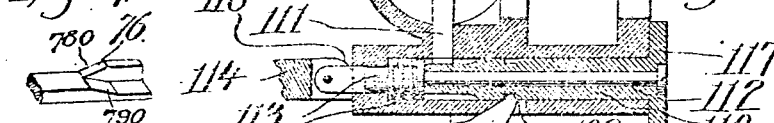
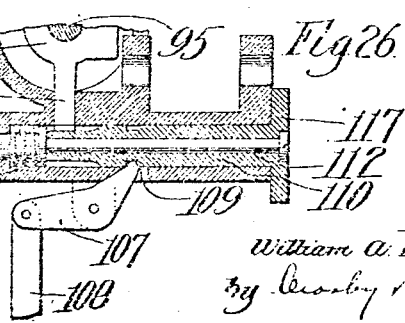
Witnesses
Thomas J. Drummond
S. Wm. Lutton
Inventor
William A. E. Henrici
By Crosby Gregory
attys

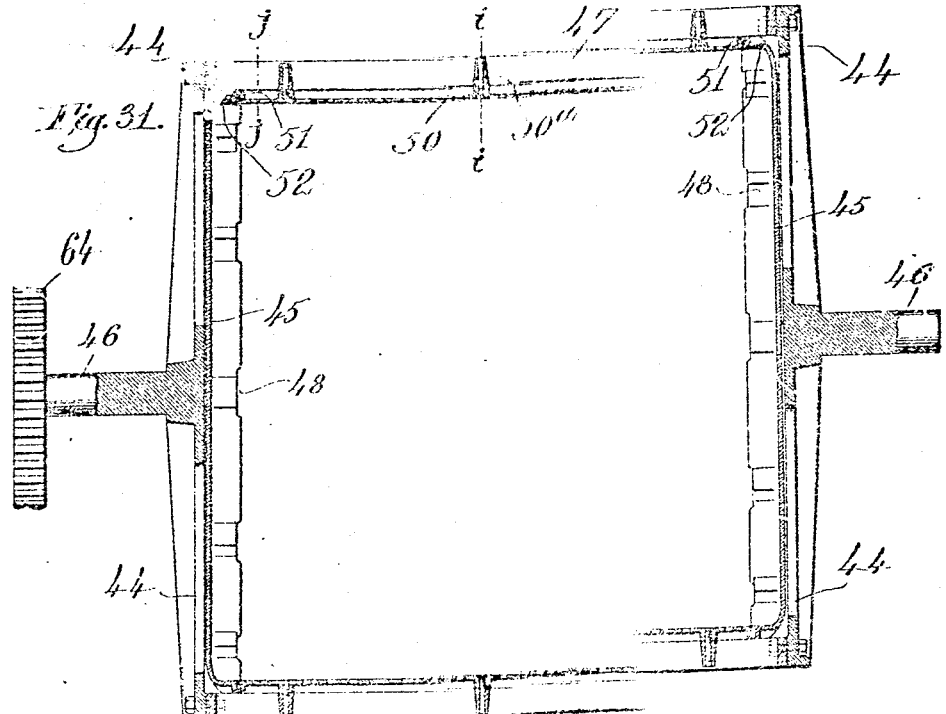
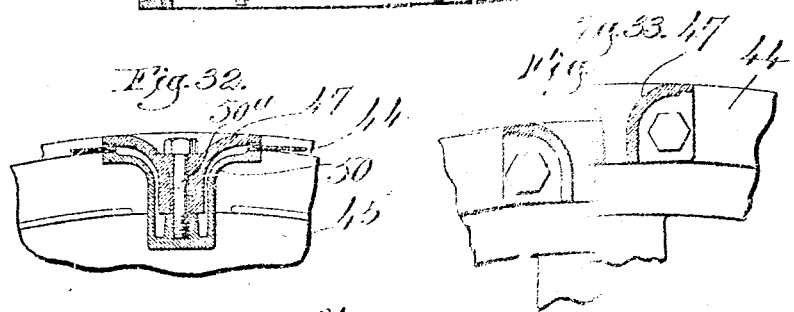
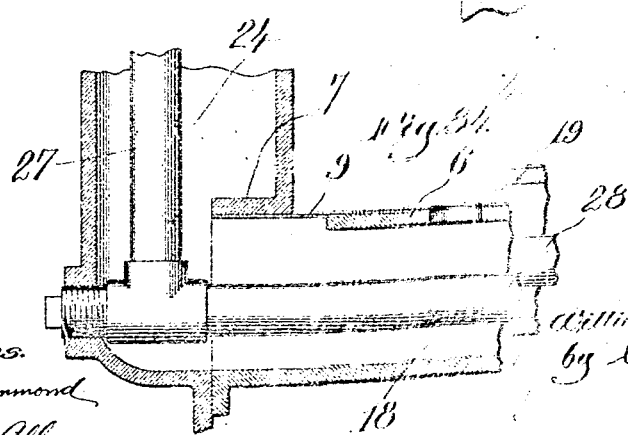

W. A. E. HENRICI.
WASHING MACHINE.
APPLICATION FILED FEB. 6, 1905.

947,776.

Patented Jan. 25, 1910.
9 SHEETS—SHEET 9.

Witnesses:
Thomas J. Drummond
William L. Friary

Inventor.
William A. E. Henrici,
by Crosby & Gregory
attys.

UNITED STATES PATENT OFFICE.

WILLIAM A. E. HENRICI, OF BOSTON, MASSACHUSETTS, ASSIGNOR, BY MESNE ASSIGNMENTS, TO LIBERTY TRUST COMPANY, TRUSTEE, OF BOSTON, MASSACHUSETTS, A CORPORATION OF MASSACHUSETTS.

WASHING-MACHINE.

947,776. Specification of Letters Patent. Patented Jan. 25, 1910.

Application filed February 6, 1905. Serial No. 244,329.

*To all whom it may concern:*

Be it known that I, WILLIAM A. E. HENRICI, a citizen of the United States, residing at Boston, county of Suffolk, and State of Massachusetts, have invented an Improvement in Washing-Machines, of which the following description, in connection with the accompanying drawing, is a specification, like characters on the drawings representing like parts.

This invention relates to power washing machines, and among the objects of the invention are to make those portions of the machine with which the washing materials come in contact absolutely non-corrosive so that they will not be affected by boiling hot water, or the action of soap, alkali or chemicals; to provide a washing machine which is highly efficient and economical in operation; to provide a machine with means whereby the inner cylinder or drum may be reversed automatically after one, two, three, four, or more revolutions, as desired, and without the use of more than one belt; to provide a machine with a novel stop mechanism which brings the inner cylinder to rest with its door always opposite the door of the outer cylinder or casing; to provide means for the uniform distribution of all wash materials, such as soap, bluing, bleaching material, etc., throughout the entire length of washer; to provide for the uniform distribution of steam and hot and cold water throughout the length of washer; to provide a novel properly drained gutter, through which the water, soapsuds, etc., in the machine may be quickly discharged without leaving any sediment in the machine; to provide a reliable water and time indicator to correctly indicate the height of water in the machine, the amount of water needed for soaping, rinsing, bluing, bleaching, etc., and also to show the exact times when the different operations in the wash process need attention or changing; to provide a metal washing machine in which the entire construction is sectional, so it can be easily taken apart and any individual parts can consequently be readily renewed; to provide a machine having a sectional inner drum or cylinder of such construction that the sections can be inserted through the door of the outer cylinder and assembled therein, and any individual element of the inner drum may be removed and replaced through said door, without disturbing the outer cylinder; and to provide a machine in which some or all of the parts are manufactured from sheet metal and pressed into shape.

Figure 36:
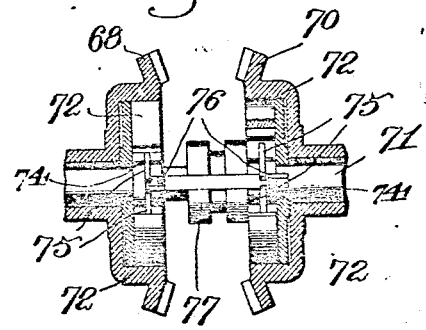
Figure 37:
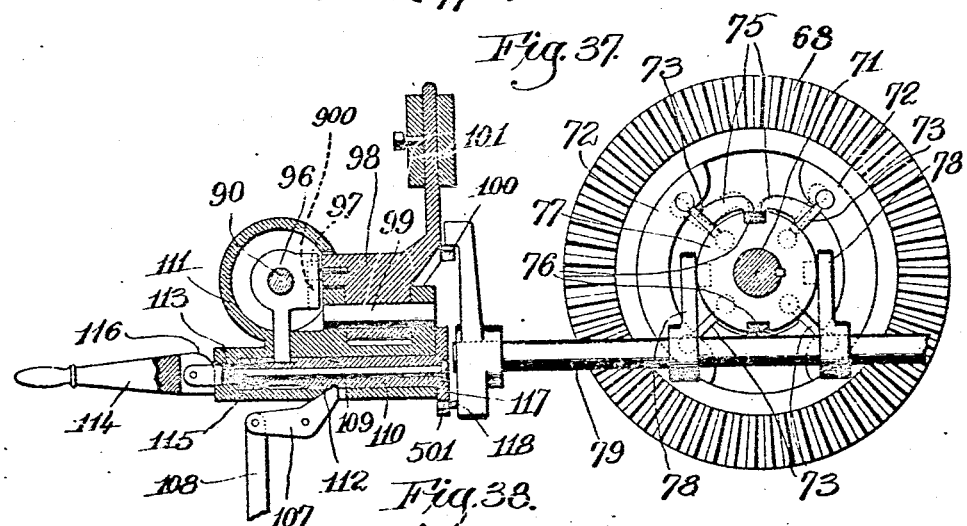
Figure 38:
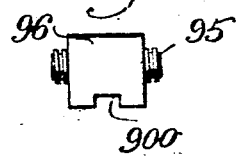

Referring to the drawings, Figure 1 is a perspective view of a washing machine embodying my invention; Fig. 2 is an end elevation of the end of the machine opposite to that shown in Fig. 1; Fig. 3 is a section on the line *x—x*, Fig. 4; Fig. 4 is a side elevation with part of the casing or outer cylinder removed; Fig. 5 is a section through one of the end plates of the inner cylinder or drum on substantially the line *y—y*, Fig. 3; Fig. 6 shows the cross sectional shape of the end plate on substantially the line *a—a*, Fig. 3; Fig. 7 is a plan view of a portion of the door frame of the washing cylinder; Fig. 8 is a section on the line *b—b*, Fig. 7 looking toward the left; Fig. 9 is a detail of the inner drum showing the manner in which the perforated plates are held in place; Fig. 10 is a section through the end of the inner drum on the line *d*, Fig. 13; Fig. 11 is a similar section on the line *e*, Fig. 13; Fig. 12 is a longitudinal section through a tie-bar and lifting-bar of the inner drum; Fig. 13 is an enlarged side view of a portion of the end plate of the inner drum; Fig. 14 is an end elevation of the driving mechanism; Fig. 15 is a section on the line *f—f*, Fig. 14; Fig. 16 is a section on the line *g—g*, Fig. 14; Fig. 17 is a section through the reversing gearing; Fig. 18 is a detail of the clutch in the reversing gear; Fig. 19 is a section on the line *h—h*, Fig. 21; Fig. 20 is a detail of the weighted throw lever of the reversing mechanism hereinafter referred to; Fig. 21 is a vertical section through the gearing for regulating the reversing mechanism the gear wheels being shown in elevation; Fig. 22 is a detail of the stop mechanism hereinafter referred to; Fig. 23 is also a detail of the speed-changing mechanism; Fig. 24 is a top plan view of the bridge-piece; Fig. 25 is an end view of Fig. 24; Fig. 26 is an enlarged sectional view of the stopping mechanism; and Fig. 27 is a detail of the wedges for operating the clutches; Fig. 28 is a detail of the connection 120; Fig. 29 is a detail of the time indicator; Fig. 30 is a detail of the lock for the door of the drum; Fig. 31 shows the inner drum detached, said figure being a vertical section through the drum; Fig. 32 is a section on the line i—i, Fig. 31; Fig. 33 is a section on the line j—j, Fig. 31, with the head 45 omitted and Fig. 34 is a vertical longitudinal section through the outer shell in the vertical plane of the gutter; Fig. 35 is an enlarged detail view showing the communication between the conduit 29 and the interior of the shell; Fig. 36 is a sectional view through the clutch mechanism; Fig. 37 is a view similar to 22 but showing in addition a cross section of the clutch; Fig. 38 is a detail of the nut 96.

The machine comprises in its construction an outer cylinder or casing within which is mounted to rotate an inner cylinder or drum in which the articles to be washed are placed, all as usual in this class of devices.

*The outer cylinder or casing.*—The outer cylinder of my improved washing machine comprises two heads and a shell, and contains one of the novel features of my invention. The heads are made solid and the shell is held in place about the heads without being secured thereto by means of rivets or bolts. The heads are designated by 3 and 4 respectively, and each has a central aperture to receive a journal of the inner or washing cylinder and is shaped to present legs or stands 3ª on which the machine rests. Said heads are tied together by tie-rods 5 and by the bridge-piece 6, hereinafter described. The shell is preferably of sheet metal and encircles and is supported by annular flanges 7 on the heads. Said shell is made of two parts 9 and 10 which are adjustably connected together so that a tight joint around the heads may always be maintained. As herein illustrated, one edge of one part 9 of the shell is looped about one of the tie-rods 5, and one edge of the other part 10 of the shell is looped about an adjacent tie-rod 5, as best seen in Fig. 3. The opposite edges of the two parts of the shell are adjustably connected together by some suitable means, preferably that shown in Fig. 25, which comprises a turn-buckle arrangement 11 connected to lugs 12 secured to the two parts 9 and 10 of the shell. The open space between the two adjacent tie-rods 5, which is not covered by the two parts of the shell, constitutes the door opening of the outer cylinder, said opening being closed by a suitable door 13 which is herein shown as slidably mounted within the shell on ways or flanges on the heads. One edge of the door is shaped to form the flange 14 which constitutes both a handle for opening and closing the door, and also a stop to limit the closing movement thereof. A tight joint between the shell and the flanges 7 can be secured by means of the turn-buckles, as will be obvious, for by tightening up said turn buckles, the adjacent edges of the shell are drawn together and the shell is pulled tightly against the flanges 7, the shell itself during this tightening operation being subjected to tensile strain. The adjacent edges of the two parts of the shell rest on a bridge-piece 6 which extends from one head to the other, see Figs. 3 and 4, and which closes the space between said adjacent edges. This bridge-piece is shaped at each end to present a foot-portion 16 which is secured directly to the adjacent head 3 or 4 of the cylinder, and at each end to constitute a recess or chamber 17 in which the turnbuckle at that end of the cylinder is located. Said bridge-piece is also shaped to form a longitudinal gutter 18 having an inclined bottom which extends from one end to the other of the cylinder and through which the water is delivered to the machine and discharged therefrom. Said gutter has communication with the interior of the cylinder through a plurality of apertures 19 in the shell, and at one end it communicates with a discharge port which is controlled by a suitable outlet valve 20. This valve may be of any usual or suitable construction, that herein shown being an ordinary gate-valve pivotally mounted on a stem or shaft 21 provided with a counter-balance weight 22 which is so adjusted as to hold the valve in either its open or its closed position. I have located the valve in a valve-casing 23 which is secured to the head 4 of the cylinder in any suitable way.

The head 4 is formed with the vertical chamber or conduit 24 which communicates with the gutter and through which the hot or cold water is delivered to the gutter, said chamber having secured to its upper end hot and cold water pipes 25 and 26, as will be seen in Figs. 1 and 4. A steam-pipe 27 extends down through the chamber 24 and connects with another steam-pipe 28 running longitudinally of the gutter. Said latter steam-pipe is provided with a plurality of apertures so that the steam can be admitted directly to the water for the purpose of bringing the clothes to a boil at the proper time.

By delivering the water to the gutter and from the gutter into the machine, and by properly proportioning the size of the apertures 19 to that of the conduit 24, I obtain an even distribution of the water into the cylinder along its entire length.

*Means for distributing washing materials to the cylinder.*—Extending the length of the outer cylinder and communicating therewith at intervals is a conduit 29, see Figs. 3 and 35, by means of which washing material, such as soap, alkali, bluing, etc., may be uniformly delivered to the cylinder throughout its length. This conduit may be made in a great variety of ways, and the form herein shown, and that which I find eminently practical, is simply a piece of sheet metal shaped as shown in Figs. 1, 3 and 35, and secured to the outer side of the shell. At each end this conduit communicates, by means of a suitable pipe or connection 30, with a tank 31, into which tanks the washing materials may be placed. The shell is provided with a plurality of small apertures 32 which communicate with the interior of the conduit 29 and through which the material which is fed into the conduit from the tanks is discharged into the cylinder. I have also provided the cylinder with a plurality of larger apertures 33 above the apertures 32, see Fig. 35, so that as the inner cylinder is rotated more or less of the liquid in the cylinder is thrown into the conduit through the larger apertures and allowed to drain back into the cylinder through the small apertures 32. In this way, the material which is delivered to the conduit is being constantly washed into the cylinder, thereby keeping the conduit clean and providing for the uniform distribution of the material in the cylinder.

*Time and water indicators.*—On one end of the outer cylinder is a chamber 34 which communicates at its lower end with the upper end of the gutter. Within this chamber, which is elongated as shown in Fig. 2, is situated a float 35 to which is connected a stem 36 passing out through the top of the chamber and carrying a suitable pointer or indicator 37 which coöperates with the scale 38 carried by the machine and thus serves to indicate the height of the liquid in the outer cylinder, as will be obvious. In conjunction with the scale 38, I also employ one or more adjustable pointers or indicators 39, said indicators being marked "Soaping", "Rinsing", "Bluing", "Bleaching", or words of like or similar import, and each one being positioned on the scale to indicate the amount of water needed in the machine while the operation imprinted on it is being performed.

40 designates a time-indicating scale with which coöperates another pointer 41 to indicate the time when the various operations, such as rinsing, bluing, soaping, bleaching, etc., have to be performed. This indicator 41 comprises a shell 42 having a sight opening and within which shell is rotatably mounted a drum 43 having imprinted thereon the words "Soaping", "Rinsing", "Bluing", "Bleaching", or words of like or similar import, any one of which words may be brought in alinement with the sight opening by the rotation of the drum. This indicator is placed on the scale 40 in the proper position to indicate the time when the next operation is to be performed and the drum 43 is turned to show what that operation is. This indicator is to be adjusted on the scale from time to time as the washing process progresses.

*The inner or washing cylinder.*—In the present embodiment of my invention the inner cylinder comprises in its construction end-heads which are connected together by tie-bars, and perforated metallic plates supported by the tie-bars. The end-heads are herein shown as each comprising a spider 44 and an end-plate 45 suitably connected thereto, the end plate forming the end of the inner cylinder. Each spider is provided with the stud or journal 46 which rotates in suitable bearings in the corresponding head of the outer cylinder, and the two spiders are connected together by tie-bars 47 which extend the length of the inner cylinder. The end-plates 45 are dished, are imperforate, have smooth inner faces, are of substantially the same diameter as the spiders and are provided with peripheral notches 48 through which the tie-bars 47 pass, as best seen in Fig. 11, and each end-plate is bolted or otherwise secured to its spider, as at 49, as shown in Fig. 10. Inclosing each tie-bar 47 is a lifting-bar 50 having substantially a U-shape, as best shown in Figs. 3 and 9, said lifting-bars being provided with feet 51 at their ends which abut against flanges or seats 52 formed around the notches 48 of the end-plates, see Figs. 11 and 13. I may, if desired, employ suitable packing between the feet 51 and 52, to make a tight joint. The lifting-bars are detachably secured to the tie-bars in any suitable way, as, for instance, by means of the stud-bolts 50ª shown in Fig. 12. Both the tie-bars and lifting-bars are provided with longitudinally-extending foot-portions 53 adapted to receive between them the perforated plates 54 which form the sides of the inner or washing cylinder, and which extend the length thereof, see Fig. 9.

The door of the inner cylinder may be of any suitable construction and in the preferred embodiment of my invention it comprises a door frame which sustains perforated plates and lifting bars, these separate parts being detachably secured together. The door frame is designated by 55 (see Fig. 7) and it is hinged at one edge to one of the tie-bars of the drum, as shown at 56, Fig. 1. The side-rails 57 of the door-frame are provided with longitudinal grooves 58 in which one edge of the perforated plates 54 are seated, the other edge of each plate being held in position by means of the lifting-bar 59 which is secured to the central bar 60 of the door-frame.

61 designates suitable latches by means of which the door is held closed while the machine is in operation. These latches are pivoted to the door-frame and are held either locked or unlocked by a spring-pressed catch 62 which engages suitable notches in the door-frame. When the latch is in its dotted line position, Fig. 30, the nose 63 thereof enters a slot in one of the tie-bars and thus locks the door.

It will be noted that the inner drum is made up of a plurality of parts and that the several parts are detachably secured together. For instance, the tie-bars 47 are detachably secured to the spiders 44, the lifting-bars 50 are detachably secured to the tie-bars by means of the bolts 50ᵃ, and the perforated-plates 54 are removably supported by the lifting-bars and tie-bars. The stud-bolts 50ᵃ are so constructed that any bolt can be removed from the outside of the outer cylinder through its door and the bolts which secure together the spider and tie-bars 47 can also be removed by a person reaching through the door of the outer cylinder. The inner drum, therefore, can be taken down while it is still within the outer cylinder, and the parts of the inner drum are of such a size that each can be removed through the door of the outer cylinder. As a consequence, any individual part of the drum which becomes worn or damaged can be removed and a new part substituted without taking down the outer cylinder. This I regard as very important as it greatly facilitates the repair of the machine.

The parts of the inner cylinder, as well as those of the outer cylinder, are made of metal, which is rendered non-corrosive, and I prefer to make these metal parts non-corrosive by fusing porcelain or enamel onto the surface thereof. By the term "fusing porcelain or enamel" I mean to distinguish from japanning or painting with enamel paint. According to my invention the metal parts are treated in such a way that porcelain or similar material is fused and run onto the surface of the metal in a liquid state so that when the material has cooled it has a glassy or porcelain coating. With a machine having the parts so constructed there is absolutely no danger of any deterioration of the parts of the machine or staining of the articles to be washed due to corrosive action of the soap, acid, alkali, etc., used in washing, dyeing, scouring, etc., as is the case when the machine is made of wood, brass, iron, copper, etc.

*Driving mechanism.*—Fast on the journal of one of the spiders is a large gear-wheel 64 adapted to mesh with a pinion 65, which pinion is driven from a suitable driving pulley 66 through intermediate reversing gear, as shown in Fig. 17. This reversing mechanism is used to reverse the direction of rotation of the inner cylinder at desired times.

*Reversing mechanism.*—The driving pulley 66 is fast on a sleeve 67 having rigid or integral therewith a bevel-gear 68. Said bevel-gear 68 meshes with another bevel-pinion 69 which in turn meshes with and drives a bevel-gear 70. The pinion 65 above referred to is fast on a shaft 71, and carried by said shaft are two clutches by means of which either one or the other of the bevel-gears 68 and 70 may be clutched to the shaft 71 dependent on the direction in which it is desired to rotate said shaft see Figs. 17 and 36. Any suitable or usual clutch mechanism may be employed to clutch one or the other of these gears to the shaft. I have herein shown two clutches, each of which comprises two clutch-shoes 72 which are pivoted by means of links 73 to a collar 74 fast on the shaft 71. Each link 73 carries an arm 75 which rests on and is controlled by a double wedge 76 connected to a sliding clutch-operating collar 77. Each wedge is provided with two oppositely-inclined portions 780 and 790, see Fig. 27 so that as the wedges are moved longitudinally, one arm of each brake-shoe is thrown outwardly, and the other arm allowed to swing toward the center. This movement turns the links 73 about their pivotal connection with the collar and throws the brake-shoes out against the friction surface of the gears. As shown in Figs. 17 and 36, the gear 70 is clutched to the shaft, but it will be obvious that movement of the clutch-operating collar 77 to the left will disengage said gear and cause the other gear to be clutched to the shaft, thus reversing the direction of rotation of the washing cylinder. The clutch-operating collar is given its longitudinal movement by an arm 78 on a rock-shaft 79, see Fig. 37 which is controlled by the controlling mechanism now to be described.

In all washing machines with which I am now familiar the inner drum is reversed after one and one-eighth (1⅛) revolutions, and no provision is made for changing the number of revolutions between successive reversals. In washing some articles it may be desirable to reverse the drum after a greater number of revolutions than in washing other articles, and therefore I have provided means whereby the drum may be rotated a greater or less number of times, as desired, between successive reversals. The mechanism I have herein illustrated for this purpose is that which I have found most practical, but as I believe I am the first to provide any means for regulating the number of revolutions of the drum between successive reversals I desire to claim this feature broadly.

Fast on the shaft 46 supporting the gear 64 is a small gear 80 meshing with a gear 81 on a counter-shaft 82 which is supported in suitable bearings. This shaft 82 has thereon a small gear 83 splined thereto in such a manner as to allow of a longitudinal motion along shaft 82. Loosely mounted on the hub of the gear 83 is an arm 84 carrying a gear 85 which meshes into gear 83 and also into gears 86, 87, 88 or 89, carried on the shaft 90, at the will of the operator. This is done by moving the arm 84 longitudinally of the shaft and at the same time swinging it about the shaft. The arm projects through a stepped slot 91 in the gear casing 92 and it carries a locking pin 93 which is adapted to engage any one of a plurality of notches or perforations 94 thereby to hold the arm in any desired position, according to the speed it is desired to give the inner cylinder. The shaft 90 is provided with a screw-threaded portion 95, on which is mounted a nut 96, and said nut has a recess 900 on its side see Fig. 38 in which is received a projection 97 on a swinging weighted member 98 carried on a suitable rock-shaft 99. This weighted member 98 has two projections or stops 100 see Fig. 20, which are adapted to engage alternately an arm 101 fast on the shaft 79, as best seen in Figs. 14 and 37. With this construction, it will be seen that as the inner cylinder is rotated, the shaft 90 is also rotated through one of the gears 86, 87, 88, 89, the speed at which said shaft 90 rotates depending upon which one of the gears 86, 87, 88, 89 the gear 85 meshes with. The rotation of the shaft 90 will obviously move the nut 96 longitudinally, such movement of the nut operating to swing the weighted member 98 about its pivot. During the swinging movement of said weighted member, one of the projections 100 is brought into engagement with the arm 101, and as the weighted member is carried to bring the weight thereof beyond the dead center, said weight gives an accelerated movement to the member, and thus rocks the shaft 79 sufficiently to throw the clutch-operating collar 77 and thus reverse the direction of rotation of the pinion 65. The inner cylinder is now rotated in the opposite direction, and the nut 96 moved backwardly, such movement operating to throw the rock-shaft 79 back to its initial position, and thereby again reverse the direction of rotation of the drum. The speed at which the shaft 90 rotates, relative to the speed of rotation of the large gear 64, controls the number of revolutions which the washing cylinder will make before the reversing takes place, and by regulating the speed of the shaft 90 by means of the change gear above described, the inner cylinder can be made to rotate, once, twice, three, four or more times before it reverses.

*Stopping mechanism.*—As stated above, I have provided my improved washer with mechanism by means of which the inner or washing cylinder is brought to rest with its door opposite the door opening in the outer cylinder whenever the machine is stopped. In the embodiment of my invention herein shown the stopping of the inner cylinder is accomplished by applying a brake to the gear wheel 64 and said brake is controlled by mechanism which only acts when the inner cylinder is properly located. As illustrating one simple and efficient brake mechanism I have shown two brake-shoes or jaws 102 adapted to grip the rim of the gear 64 at the proper time, and said jaws are herein shown as being operated by a rock shaft 103 mounted in suitable bearings on one of the heads of the cylinder. These jaws are shown as having right and left hand screw threaded connection with said shaft whereby when said shaft is turned in one direction the jaws are closed together against the rim of the gear wheel, and when the shaft is turned in the opposite direction said jaws are disengaged from the wheel. It will be understood, of course, that the jaws are held from rotation by any suitable means. The shaft 103 is herein illustrated as being provided with a weighted arm 104 so situated as to tend normally to rock said shaft in the direction to apply the brake jaws. Said arm is held out of operation by means of a suitable pawl or catch 105 which engages a lug or projection 106 rigid with the arm. The pawl 105 is controlled by a controlling mechanism which operates to release said pawl just at the proper time to bring the inner cylinder to rest with its door opposite the door in the outer cylinder. In the form of the invention herein shown the pawl is connected to a pivotally mounted latch 107 by means of a link 108, and one end of said latch normally operates in and occupies a groove 109 in a rotatable sleeve 110 as shown in Figs. 22, 26 and 37. This sleeve is mounted in suitable bearings and is provided with gear teeth to engage a rack 111 formed on or secured to the nut 96 above described; see Figs. 21, 22 and 37. So long as the nose of the latch 107 occupies the groove 109 in the sleeve 110, the catch 105 is in position to engage the lug 106 and thus hold the weighted lever 104 out of operation. If, however, the sleeve 110 is moved longitudinally or to the right, Figs. 22 and 37, the latch 107 will be rocked, thereby releasing the pawl 105 from the lug or projection and allowing the weighted lever to throw the brake into operation.

Extending longitudinally through the sleeve 110 is a pin or rod 112 which is secured at one end to a plunger 113, on which plunger is pivotally mounted a stopping handle 114. Said plunger bears against the end of the sleeve 110 as seen in Figs. 22, 26 and 37, and is acted upon by a suitable spring 115 which tends normally to project the plunger toward the right. The stopping lever 114 is provided with a cam surface 116 which engages a portion of the casing and by means of which the rod 112, and consequently the sleeve, is moved to the left, Fig. 22, when the lever is thrown into its horizontal position. When the lever is thrown upwardly, however, this cam surface allows the spring 115 to come into play, thereby to throw the parts to the right.

In order to prevent any longitudinal movement of the sleeve 110 until the inner cylinder is properly positioned, I have provided the sleeve with a disk or head 117 having an aperture 501 of a size to receive a pin 118 carried by the arm 101, said pin by its engagement with the disk 117 preventing any longitudinal movement of the sleeve until the said pin and the aperture come into alinement.

From the above description, it will be clear that whenever the handle 114 is thrown upwardly the inner cylinder will be brought to rest as soon as the pin 118 and its aperture 501 come into alinement, for the throwing of the handle into this position releases the spring 115 so that as soon as the pin and hole do come into alinement the sleeve 110 is thrown to the right, Figs. 14 and 22, thereby to disengage the pawl 105 and allow the weight 104 to come into operation and set the brake.

The brake is of such a character that it stops the drums almost instantly whenever it is applied.

The gear teeth on the sleeve 110 and those on the nut 96 are so proportioned with reference to the other gearing of the driving and releasing mechanism that the pin on the cam 118 can come into alinement with the hole 501 in the disk 117 only when the inner cylinder is in the desired position for stopping. The gearing above described is also so designed that said pin and aperture come into alinement only when the reversing mechanism has disengaged one of the gear wheels 68 and 70 from the shaft 71, preparatory to clutching the other gear wheel to said shaft, and therefore the brake is applied only when the clutch is released. With my improved mechanism, therefore, the operator does not have to throw the stopping handle at any particular time, but whenever he wants to stop the machine he can operate it and rest assured that the inner cylinder will come to rest in the correct position.

The lever 114 is a brake-releasing lever as well as a stopping lever. By this I mean that the brake can be released by operating said lever in a direction opposite to that in which it is operated to stop the machine. In order that said lever may be used to release the brake I have connected the lever with the shaft 103 in such a way that the swinging of the lever from its vertical to its horizontal position will turn the shaft in a direction to loosen the brake jaws from the wheel 64. As herein shown the lever is provided with an extension or arm 119, to which is connected a tubular member 120 into which telescopes a rod or stem 121. Said rod or stem is connected with an arm 122 on the shaft 103, as best seen in Fig. 14, and it passes through a plug 123 in the end of the member 120 and has upon its end a head 124 see Fig. 28. By having this telescopic connection between the lever 114 and arm 122, said lever may be thrown into its vertical position without turning the shaft 103, but after said shaft has been turned and the brake set, the movement of the lever into horizontal position will operate on the shaft to release the brake as will be obvious. If the weighted arm 98 should not of itself complete its movement thus starting the machine it may be readily shifted in one direction or the other by hand. The swinging of the lever 114 into the horizontal position will obviously retract the sleeve 110, and thereby withdraw the disk 117 from the pin 118. As soon as this occurs the weighted arm 98 will complete its movement in one direction or the other, and will thereby throw one or the other of the clutches into operation thereby starting the machine. In order to permit this action the groove 900 in the nut 96 is made sufficiently wide so that there is some lost motion between the nut and the pin 97.

In order to take up wear as it occurs between the brake jaws and the wheel 64, I have adjustably connected the weighted arm 104 to the shaft 103, so that said shaft may be turned relative to the arm as wear occurs. As herein shown said shaft is provided with a disk 125, provided with a plurality of apertures 126 and the arm 104, which is loose on the shaft, is provided with a pin 127 which can be inserted into any one of the apertures 126, so that by advancing the pin from one to another aperture the wear of the brake jaws can be taken up.

All the parts of the inner drum as well as those of the outer cylinder are made of such shape that they can be pressed into shape from sheet metal. This is an important feature of my invention as by thus making the parts of pressed or stamped sheet metal, the weight of the machine is much reduced without reducing its strength and its manufacture is facilitated and cheapened.

While I have described with great particularity in detail one embodiment of my invention, yet inasmuch as many of the features above described are broadly new, I do not wish to be limited to the exact construction shown. Many changes, therefore, may be made in the construction of various parts and in their arrangement without departing from the invention expressed in the appended claims, many of which are very broad.

Having fully described my invention, what I claim as new and desire to secure by Letters Patent is:—

1. In a washing machine, a cylinder, and a drum rotatable within the cylinder, said drum having at each end a spider provided with a journal rotatable in a bearing carried by the cylinder, tie-bars connecting said spiders, a dished end plate overlying the inner face of each spider, means to secure each end plate to its spider, and a lifting-bar sustained by each tie-bar, each lifting-bar abutting at its ends the inner faces of the end plates.

2. A clothes drum for a washing machine comprising spiders, tie-bars setting between the opposed faces of the spiders and secured thereto, end plates covering the inner faces of the spiders, said end plates being curved inwardly toward each other at their peripheries, and lifting-bars secured to the tie-bars and fitting between the inwardly curved portions of the end plates.

3. A clothes drum for a washing machine comprising spiders, tie-bars setting between the opposed faces of the spiders and secured thereto, end plates covering the inner faces of the spiders, said end plates being curved inwardly toward each other at their peripheries, and lifting-bars secured to the tie-bars and fitting between the inwardly curved portions of the end plates, said end plates being secured to the spiders by means separate from that employed for securing the tie-bars thereto.

4. In a washing machine, a cylinder, and a drum rotatable within the cylinder, said drum having at each end a spider provided with a journal rotatable in a bearing carried by the cylinder, tie-bars connecting said spiders, a dished end plate overlying the inner face of the spider, means to secure each end plate to its spider, a lifting-bar embracing each tie-bar, each lifting-bar abutting at its ends the inner faces of the end plates, and each end plate having peripheral notches to receive the tie-bars.

5. In a washing machine, a cylinder, and a drum rotatable within the cylinder, said drum having at each end a spider provided with a journal rotatable in a bearing carried by the cylinder, tie-bars connecting said spiders, a dished end-plate overlying the inner face of the spider, means to secure each end-plate to its spider, and a lifting-bar secured to each tie-bar, each lifting-bar abutting at its ends the inner faces of the end-plates, the lifting-bars and end-plates each having a coating of fused porcelain thereon.

6. A clothes drum for washing machines comprising spiders, stamped metal tie-bars extending between the exposed faces of the spiders and secured thereto, stamped metal end-plates covering the inner faces of the spiders, said end-plates being curved inwardly toward each other at their peripheries, and stamped metal lifting-bars secured to the tie-bars and fitting between the inwardly curved portions of the end-plates, said end-plates having peripheral notches to receive the tie-bars.

7. In a washing machine, a cylinder, a drum rotatable within said cylinder, said drum having at each end a spider journaled in the cylinder, an end-plate secured to each spider, each end-plate having substantially the same diameter as the spider and being curved inwardly at its periphery, tie-bars connecting said spiders, said tie-bars being received between the spiders and occupying peripheral notches in the end-plates, perforated plates between the tie-bars, and lifting-bars inclosing the tie-bars, each lifting-bar being received between the end-plates.

8. A drum for a washing machine comprising a spider at each end, an imperforate end plate having a smooth inner face secured to each spider, tie-bars connecting said spiders, each end plate being provided with notches which are open at the periphery of said end plate to receive the tie-bars, perforated plates between the tie-bars and a lifting bar secured to each tie-bar.

9. In a washing machine, an outer cylinder for a rotary drum, said outer cylinder comprising heads having annular flanges, a shell encircling said flanges and means to exert tensile strain on the shell thereby to clamp it onto the heads.

10. In a washing machine, an outer cylinder, and a rotary drum within the cylinder, said outer cylinder comprising heads, a divided shell inclosing said heads, and means to exert tensile strain on the shell to clamp it onto the heads.

11. In a washing machine, a cylinder having heads, tie-rods connecting said heads and a sectional shell, encircling said heads and having its edges bearing against said heads, one edge of each section of the shell being secured to a tie-rod, and adjustable means to connect the other edges of said sections together and clamp them to the heads.

12. In a washing machine, an outer cylinder having heads, tie-rods connecting said heads and a sectional shell, one edge of each section of the shell being secured to a tie-rod, adjustable means to connect the other edges of said sections together, and an inner drum rotatable within the outer cylinder.

13. In a washing machine, an outer cylinder having heads provided with annular flanges, tie-rods connecting said heads, a shell encircling said flanges and having a longitudinal opening in its underside, a bridge-piece connecting said heads and bridging said opening in the shell, and means connecting the adjacent edges of the shell to draw them together thereby to clamp the shell against the flanges of the heads.

14. In a washing machine, an outer cylinder having heads, a flexible sheet metal shell encircling said heads, said shell having a longitudinal opening in its underside, and clamping means secured to the edges of the shell to draw the latter toward each other and thereby clamp the shell tightly to the head.

15. In a washing machine, an outer cylinder having heads, a sheet metal shell encircling the heads, said shell having a longitudinal opening in its underside, a bridge-piece spanning said opening, and means to draw the edges of the shell toward each other, thereby to clamp the shell to the heads, said bridge-piece being formed with a gutter therein which communicates with the interior of the shell.

16. In a washing machine, an outer cylinder or casing comprising rigidly connected heads, a flexible shell inclosing the heads, and means to subject the shell to tensile strain and thereby clamp it at its ends upon the heads.

17. In a washing machine, a cylinder, a rotary drum within the cylinder, said cylinder having a set of small apertures in its side, a conduit communicating with said apertures, and means to deliver washing agents to said conduit, said cylinder having above the first named apertures a second set of larger apertures, which also communicate with the conduit.

18. In a washing machine, a cylinder having a door-opening, a drum within said cylinder, said drum having a door, means to rotate said drum, and automatically operative means to bring the drum to rest and to immovably hold it with its door opposite the door-opening in the cylinder when said drum is stopped.

19. In a washing machine, a cylinder having a door-opening, a drum within said cylinder, said drum having a door, means to rotate the drum, a brake to stop the drum, and means to apply the brake only when the door of the drum is opposite the door-opening in the cylinder.

20. In a washing machine, a cylinder having a door-opening, a drum within said cylinder, said drum having a door, means, including a clutch, to rotate said drum, a brake for the drum, and means to disengage the clutch and simultaneously apply the brake.

21. In a washing machine, a cylinder having a door-opening, a drum within said cylinder, said drum having a door, means, including a clutch, to rotate said drum, a brake for the drum, and means to d' engage the clutch and simultaneously apply the brake, said means operating only when the door of the drum is opposite the door-opening in the cylinder.

22. In a washing machine, a cylinder having a door-opening, a drum within said cylinder, said drum having a door, means to rotate the drum, a brake therefor, means to hold the brake normally inoperative, and means to apply the brake to bring the drum to rest only when the door of the drum is opposite the door-opening of the cylinder.

23. In a washing machine, a cylinder having a door-opening, a drum within said cylinder, said drum having a door, means to rotate the drum, an automatically-operative brake therefor, means to hold the brake normally inoperative, and means to release the brake for action only when the drum is in a predetermined position.

24. In a washing machine, a cylinder, a drum therein, means to rotate the drum, an automatically-operative brake therefor, means to hold the brake normally inoperative, a manually controlled stopping lever, and means controlled thereby to release the brake for operation only when the drum is in a predetermined position.

25. In a washing machine, a cylinder, a drum within the cylinder, means to rotate said drum, said means including a clutch, and means to disengage the clutch and bring the drum to rest in a predetermined position only.

26. In a washing machine, an outer cylinder or casing having an opening, a drum rotatable in the cylinder and having a door, means to rotate the drum, a manually-operated stopping device for said means, and means rendered operative automatically by actuation of the stopping device to bring the drum to rest with its door opposite the opening in the outer cylinder.

In testimony whereof, I have signed my name to this specification, in the presence of two subscribing witnesses.

WILLIAM A. E. HENRICI.

Witnesses:
LOUIS C. SMITH,
BERTHA F. HEUSER.